April 29, 1958

E. J. GUTTRIDGE 2,832,541

ELECTRICAL COUNTER CIRCUITS

Filed Feb. 27, 1953

3 Sheets-Sheet 1

Inventor

ERIC J. GUTTRIDGE

By [signature]

Attorney

Inventor
ERIC J. GUTTRIDGE
By [signature]
Attorney

April 29, 1958 E. J. GUTTRIDGE 2,832,541

ELECTRICAL COUNTER CIRCUITS

Filed Feb. 27, 1953 3 Sheets-Sheet 3

Inventor
ERIC J. GUTTRIDGE
By [signature]
Attorney

United States Patent Office 2,832,541
Patented Apr. 29, 1958

2,832,541

ELECTRICAL COUNTER CIRCUITS

Eric John Guttridge, Barnes, England, assignor to Powers-Samas Accounting Machines Limited, London, England, a British company Application February 27, 1953, Serial No. 339,359
Claims priority, application Great Britain March 19, 1952
12 Claims. (Cl. 235—92)

This invention relates to electrical counter circuits of the kind responsive to successive discrete impulses and comprising binary trigger circuit stages connected in series and each having an initial condition of stability and an actuated condition of stability.

As is well understood, with a counter circuit of the kind above described provision must be made to reset all stages to their zero condition on receipt of a predetermined count and it has heretofore been proposed to do this by the use of what has been known as "forced resetting systems."

It is an object of the present invention to provide an electrical counter circuit of the kind responsive to successive impulses and which comprises a positive voltage supply lead, first, second, third and fourth bistable trigger circuit stages, each comprising a pair of anode-to-grid cross-coupled tubes, of which the first, second and third stages each have an input point common to the two tubes of the pair and the fourth stage has input and output points independent to each tube of the pair, and a coincidence circuit including a coincidence lead connecting the output point of a selected one tube of the fourth stage with the output point of a selected earlier stage, the output point of each earlier stage other than said selected stage being connected to the input point for the next succeeding stage with the output point of the third stage connected to the input point for the other tube of the fourth stage, and which avoids the use of forced resetting systems and permits modification of the counting sequence of the binary stages in a manner such that the stages regain their zero condition on receipt of a predetermined count.

A further object of the invention is to provide an electrical counter of the kind described which can be modified to function as a counter according to any predetermined scale of notation and according to any desired sequence within the said scale.

According to the present invention there is provided an electrical counter circuit of the kind referred to, in combination with two crystal diodes connected in opposite sense in said coincidence lead, a resistor large in resistance value as compared with the output impedance of the trigger circuits and connected to the coincidence lead between the diodes therein and to said positive supply lead, an input lead to the stage next succeeding said earlier stage connected to the coincidence lead between the diodes therein, and a feed forward lead connecting the output of said earlier stage with the input point of said one tube of said fourth stage through a capacitative filter.

Figure 1:
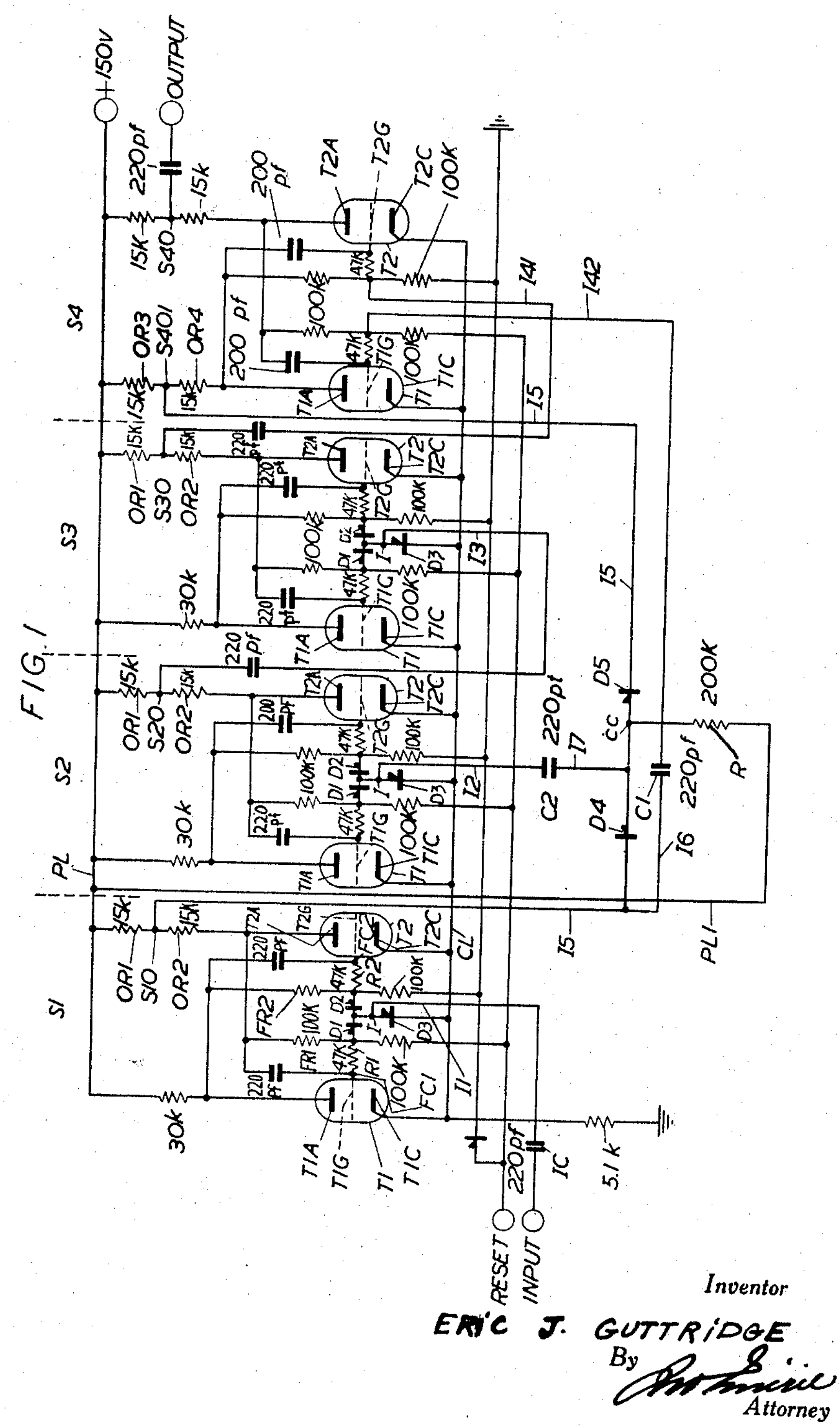
Figure 2:
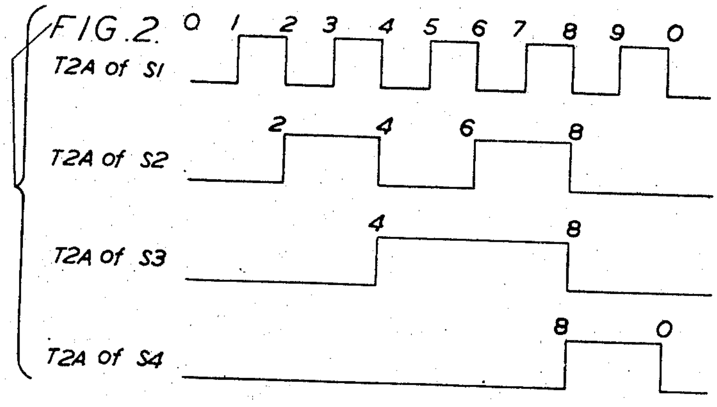
Figure 3:
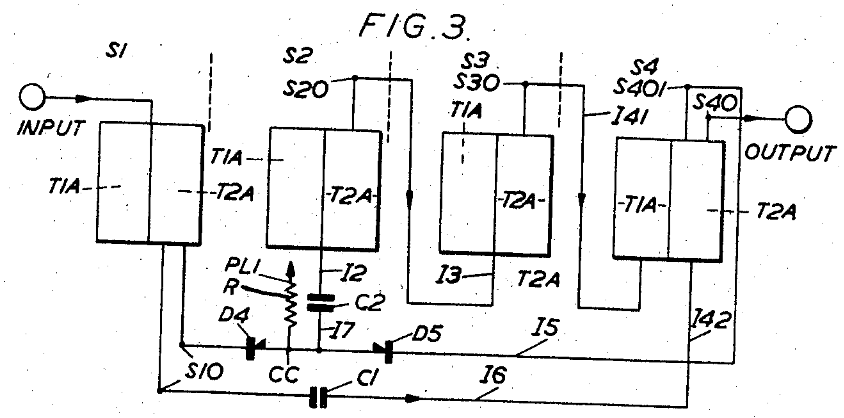
Figure 4:
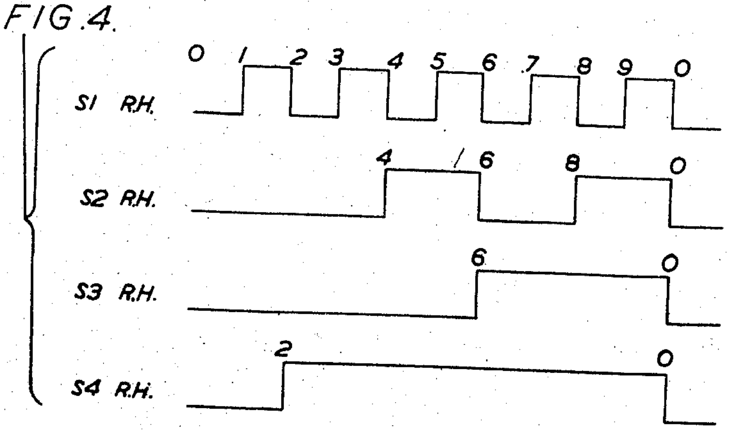
Figures 5, 6:
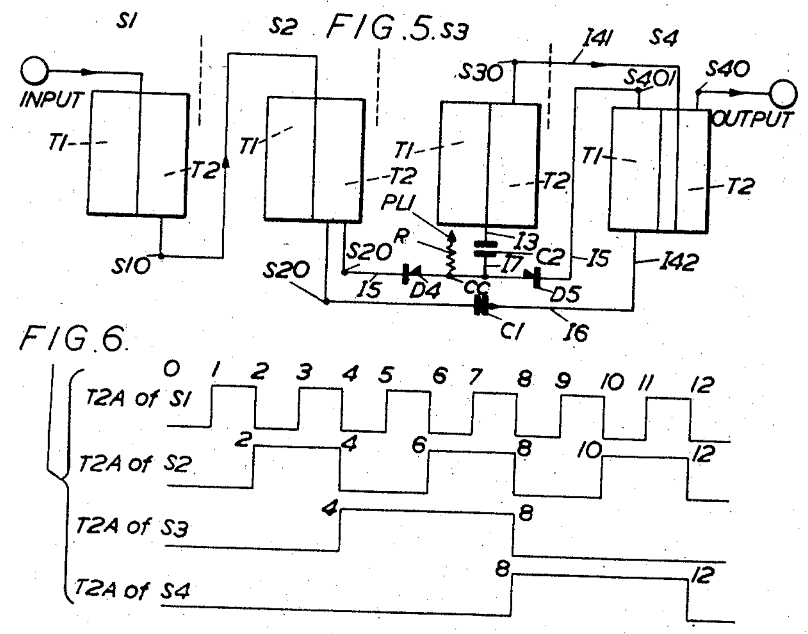
Figure 7:
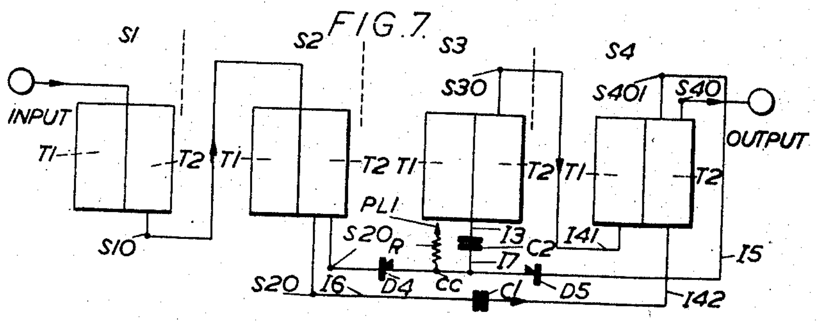
Figure 8:
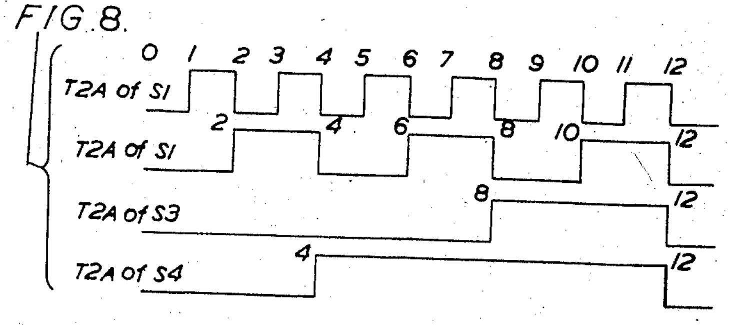

In order that the invention may be clearly understood some embodiments thereof will now be described, by way of example, with reference to the accompanying drawings, in which:

Fig. 1 is a circuit diagram of an electrical decade counter comprising four binary trigger circuit stages representative of digits 1, 2, 4, 8, respectively, Fig. 2 is a diagram illustrating the wave forms of the counter according to Fig. 1, Fig. 3 is a block schematic diagram of an electrical decade counter as illustrated in Fig. 1 but with the stages representative of digits 1, 2, 4, 2, Fig. 4 is a diagram illustrating the wave-forms of the counter according to Fig. 3, Fig. 5 is a block schematic diagram of an electrical counter as illustrated in Fig. 1 but modified to form a duodecimal counter in which the stages are representative of the digits 1, 2, 4, 8, Fig. 6 is a diagram illustrating the wave-forms of the counter according to Fig. 5, Fig. 7 is a block schematic diagram of an electrical duodecimal counter, the trigger stages of which are representative of digits 1, 2, 4, 4, and Fig. 8 is a diagram illustrating the wave-forms of the counter according to Fig. 7.

Like reference numbers refer to similar parts throughout the figures of the drawings.

Referring to Figs. 1 and 2, the counter comprises four binary trigger circuit stages S1, S2, S3 and S4, of which S1 is the first stage and S4 is the last stage, connected in sequence to represent respectively the digits 1, 2, 4, 8. Each trigger stage is a binary counter of the Eccles-Jordan type having an initial condition of stability and an actuated condition of stability and comprising triode tubes T1 and T2 having cathodes T1C, T2C and anodes T1A and T2A. These stages are designed to trigger on receipt of negative voltage input impulses and for this reason crystal diodes D1 and D2 are connected in the leads from the input point I to the tube grids T1G, T2G in such a way that they pass a negative impulse but block a positive impulse. By the employment of these crystal diodes it is possible, as indicated in Fig. 1 to use a single input coupling condenser IC.

From Fig. 1 it will be observed that a further diode D3 is connected between the input point I and the cathode lead CL and so provides a shunt path for positive impulses to the cathode lead thus ensuring that the input point I never rises above cathode potential.

Also in the grid leads of the tubes T1, T2 are resistors R1, R2 having their outer ends connected to feed-back resistors FR1 and FR2, the capacitive feed-back being taken directly to the grids as at FC1, FC2. The resistors thus serve as buffers between the input impulse and the capacitive feed-back connection and so permit an overall change-over time which can be faster than the rise time of the front of the input impulse.

Stages S1, S2, and S3, owing to the provision of input diodes D1, D2, D3, are fed by single input leads I1, I2, and I3 but stage S4 is a double-fed type trigger circuit having two separate input leads I41, I42. The tubes T2 are the output tubes of the respective stages and the tube T2 of the last stage S4 gives an output indicative that the counter has received a full count, the output, if desired, being employed to initiate a carry to a counter of next higher denomination. In the initial condition of stability, that is the zero state of the counter, each tube T1 is non-conducting and each tube T2 is conducting.

In the circuit shown in Fig. 1 backward triggering is prevented by split anode resistors OR1, OR2. Also as the full negative voltage excursion of the anodes T2A is not required for driving a succeeding stage, an attenuated output is obtained by feeding from the output points S10, S20, S30 to the input leads I2, I3, I41, I42.

Modification of the count sequence from binary to the 1, 2, 4, 8 decimal scale of notation is obtained by a diode coincidence circuit and a feed forward. The coincidence circuit comprises two further crystal diodes D4, D5 in a first or coincidence lead 15 connecting output point S10 of stage S1 with an output point S401 being the mid-point of load-splitting resistors OR3, OR4 for anode T1A of stage S4, and a resistor R in a lead PL1 connected at one end to the positive direct current lead PL and at the other end to the lead I5 at a position CC intermediate the diodes D4, D5. The feed forward consists of a second or feed forward lead I6 from the mid-point S10 of stage S1 through condenser C1 to the input lead I42 connected to the grid T1G of stage S4, this being possible because anode T1A of stage S4 is normally positive, that is the tube T1 is nonconducting, when in its zero condition. A negative input cannot alter the state of tube T1 of stage S4 except when the anode T1A thereof is negative, i. e. the tube is conducting, and this will occur only when stage S4 registers a count of 8 which is the required condition for it to be set to its zero condition on registration of a count of 10.

Connection between the output point S10 for stage S1 and the input lead I2 of stage S2 is made through the diode coincidence circuit by a condenser C2 and lead I7 connected to coincidence lead I5.

The crystal diodes D1, D2, D3, D4, and D5 may be of any known form having a self-capacity which is of a low order, examples of suitable crystal diodes being germanium rectifiers, or selenium rectifiers. Provided however, that the maximum counting speed is below 25,000 to 30,000 impulses per second it is preferred that the diodes consist of selenium rectifiers.

The mode of operation of the circuit will now be described with reference to Figs. 1 and 2, and it will be observed that, to avoid unnecessary description, in Fig. 1 the values of the various resistors and condensers have been ascribed thereto. These values are, it will be understood, those which have been found in practice to give satisfactory circuit performance but they may, if desired, be subject to modification.

In the coincidence circuit the resistance value of resistor R is large as compared with the output impedance of the tube circuits connected to it. Accordingly, if the potential of S10 corresponds to the negative line in the wave-form diagram, Fig. 2, and the potential of S401 corresponds to that of the positive lead PL the potential at position CC will be approximately that of the negative line. Further, should the potential at S401 change to negative, as the resistance value of R is large, there will be little or no change at position CC. Thus, to obtain a negative output at position CC it is necessary that the sign of the input potential at S10 and S401 should both be initially positive, the negative output at CC being obtained when one or other of the positive input potentials changes to negative. No output will be obtained at CC if the initial conditions are such that S10 or S401 is negative and the other should then also change to negative.

The arrangement of the counting circuit is such that for counts of 1 to 7 inclusive anode T1A of stage S4 is positive, that is non-conducting. Thus as anode T2A of stage S1 changes from positive to negative, that is from non-conducting to conducting, during the course of its counting a negative output will be produced at S10 which is fed into stage S2 via condenser C2 and lead I2.

When the eighth impulse is received at position I of stage S1 the anodes T2A of stages S1, S2, and S3 are positive and anode T1A of stage S4 is positive. Thus the coincidence circuit will give a negative output to lead I2 which will switch anode T2A of stage S2 to give a negative output at S20 to lead I3. This in turn switches anode T2A of stage S3 to give a negative output at S30 to lead I41 which switches anode T2A of stage S4 from negative to positive to register 8. Switching of anode T2A of stage S4 to positive causes anode T1A of that stage to become negative.

On receipt of a ninth impulse at stage S1, anode T2A thereof is again switched to positive.

The tenth impulse applied to stage S1 switches this stage so that anode T2A thereof becomes negative and emits a negative output at S10. Since, however, at this time the anode T1A of stage S4 is holding the coincidence circuit negative no impulse passes to lead I2 but the negative output impulse feeds over the feed forward lead I6 to lead I42 thus switching anode T1A of stage S4 from negative to positive with a consequent negative output from S40. At this time anodes T1A of stages S1, S2, S3 and S4 are all positive, that is non-conducting, which is their zero condition and the circuit is conditioned to receive a further ten impulses applied at stage S1.

From the foregoing description and from Fig. 2 it will be understood that a count of 10 is registered by an output from S40 and counts of 1 to 9 are registered as follows:

1 by Stage S1
2 by Stage S2
3 by Stage S1, S2
4 by Stage S3
5 by Stage S1, S3
6 by Stage S2, S3
7 by Stage S1, S2, S3
8 by Stage S4,
9 by Stage S1, S4

Figs. 3 and 4 illustrate diagrammatically the manner in which the circuit shown in Fig. 1 is modified so that the stages are representative of digits 1, 2, 4, 2. When the circuit is so modified a count of 10 is again registered by an output from S40 but counts of 1 to 9 are registered, as can be seen from Fig. 4, as follows:

1 by Stage S1
2 by Stage S4
3 by Stage S1, S4
4 by Stage S2, S4
5 by Stage S1, S2, S4
6 by Stage S3, S4
7 by Stage S1, S3, S4
8 by Stage S2, S3, S4
9 by Stage S1, S2, S3, S4

The circuit for this system of notation differs from that shown in Fig. 1 in that whereas in Fig. 1 the leads I5 and I42 are connected to anode T1A and grid T1G of stage S4 in this instance lead I5 is connected to anode T2A of stage S4 the feed forward leads I6 and I42 are connected to grid T2G of stage S4, and lead I41 is connected to grid T1G of stage S4. Accordingly, for this system of notation, when the circuit is in zero condition anodes T1A of each of stages S1, S2, S3 and S4 are positive, that is non-conducting.

When a 2 is to be registered the impulse enters stage S1 switches anode T2A thereof from positive to negative and as T2A of stage S4 is negative a negative output at S10 passes via feed forward leads I6, I42 and switches anode T2A of S4 from negative to positive. Thus when the fourth impulse is applied to stage S1 the anode T2A thereof is switched from positive to negative and, as T2A of S4 is positive, the negative output from S10 passes via CC to lead I2 and switches anode T2A of stage S2 from negative to positive.

On application of the sixth impulse to stage S1 the anode T2A thereof again switches from positive to negative and as T2A of S4 is still positive the negative output from S10 again passes via CC to switch T2A of stage S2 from positive to negative so that a negative output passes from S20 to lead I3 thus switching anode T2A of stage S3 from negative to positive.

When the eighth impulse is applied to S1 anode T2A thereof is again switched from positive to negative and as T2A of S4 is still positive the negative output from S10 again passes via CC to switch T2A of S2 from negative to positive.

On application of the tenth impulse to S1 anode T2A thereof is switched from positive to negative and as T2A of S4 is still positive the negative output from S10 again passes via CC to switch T2A of S2 from positive to negative. This gives a negative output at S20 which passes via lead 13 to switch T2A of S3 from positive to negative and this in turn gives a negative output at S30 which passes via lead I41 to switch T1A of S4 from negative to positive and so to give a negative output at S40. The passage of this tenth impulse has zeroised the entire circuit so that it is ready to receive a further ten impulses.

Figs. 5 and 6 illustrate diagrammatically the manner in which the circuit shown in Fig. 1 is modified so that the stages are representative of digits 1, 2, 4, 8 to comprise a duodecimal counter. When the circuit is so modified a count of 12 is registered by an output from S40 but counts of 1 to 11 are registered, as can be seen from Fig. 6 as follows:

1 by Stage S1
2 by Stage S2
3 by Stage S1, S2
4 by Stage S3
5 by Stage S1, S3
6 by Stage S2, S3
7 by Stage S1, S2, S3
8 by Stage S4
9 by Stage S1, S4
10 by Stage S2, S4
11 by Stage S1, S2, S4

The circuit for this system of notation differs from that shown in Fig. 1 in that whereas in Fig. 1 the co-incidence circuit connects stages S1 and S4 in this instance it connects stages S2 and S4. Accordingly for this system of notation, when the circuit is in zero condition anodes T1A of stages S1, S2, S3 and S4 are positive. Thus when the fourth impulse is received by stage S1 the anodes T2A of stages S1 and S2 are changed from positive to negative and as T1A of stage S4 is still positive the negative output from S20 passes via CC to lead 13 switching anode T2A of stage S3 from negative to positive.

When the eighth impulse is received by S1 anodes T2A of stages S1 and S2 are again switched from positive to negative and as T1A of S4 is still positive the output from S20 is again passed via CC to lead 13 thereby switching anode T2A of stage S3 from positive to negative so that a negative output occurs at S30 and passes via lead I41 to grid T2G of stage S4 thereby switching the anode T2A from negative to positive.

On feeding a twelfth impulse into stage S1 anode T1A of stage S4 is negative so that when anodes T2A of stages S1 and S2 are switched thereby from positive to negative and negative output from S20 passes via the feed forward leads I6, I42 to the grid T1G of stage S4 and switches anode T1A of stage S4 from negative to positive and gives a negative output at S40. As stage S3 was already zeroised, the application of the twelfth impulse has completed the zeroising of the counter circuit ready to receive a further twelve impulses.

Figs. 7 and 8 illustrate diagrammatically the manner in which the circuit shown in Fig. 1 is modified so that the stages are representative of digits 1, 2, 4, 4, to comprise a duodecimal counter. When the circuit is so modified a count 12 is registered by an output from S40 but counts of 1 to 11 are registered, as can be seen from Fig. 8, as follows:

1 by Stage S1
2 by Stage S2
3 by Stage S1, S2
4 by Stage S4
5 by Stage S1, S4
6 by Stage S2, S4
7 by Stage S1, S2, S4
8 by Stage S3, S4
9 by Stage S1, S3, S4
10 by Stage S2, S3, S4
11 by Stage S1, S2, S3, S4

The circuit for this system of notation differs from that shown in Fig. 1 in that whereas in Fig. 1 the coincidence circuit connects stages S1 and S4 in this instance it connects stages S2 and S4 and coincidence lead I5 and feed forward lead I42 are connected to anode T2A and grid T2G respectively of stage S4 while lead I41 is connected to grid T1G of stage S4.

In the zero condition of this circuit anodes T2A of all stages are negative, thus when the fourth impulse is received at S1 anodes T2A of stages S1 and S2 are switched to negative and, as prior to the receipt of the fourth impulse anode T2A of stage S4 is negative, the negative output from S20 passes along the feed forward leads I6, I42 and switches anode T2A of S4 to positive.

Now, when the eighth impulse is applied to S1 anodes T2A of stages S1, S2 and S4 are all positive so that a negative output is fed from position CC to lead I3 of stage S3. Thus after the application of the eighth impulse anodes T2A of stages S1 and S2 are negative and those of S3 and S4 are positive.

On feeding a twelfth impulse to S1 all anodes T2A are positive so that the impulse switches anodes T2A of stages S1 and S2 in turn to negative and the output from S20 passes via CC to stage S3 where the anode T2A is switched to negative and gives an output at S30 over line I41 to switch anode T2A of stage S4 to negative, to give an output at S40 and to complete zeroising of the circuit in readiness for a further twelve impulses.

From the foregoing it will be understood that by the present invention there has been provided an electrical counter circuit consisting of binary trigger stages which, by the use of a coincidence circuit in combination with a feed forward, can be conditioned to count according to any one of a number of scales of notation and according to a predetermined sequence within a selected scale of notation, and in which when the last impulse of a cycle passes as an output from the last counter stage all the stages are in zero condition thus avoiding the necessity of a feed-back impulse to zeroise any preceding stage.

I claim:

1. An electrical counter circuit responsive to successive impulses which comprises a positive voltage supply lead, first, second, third and fourth bistable trigger circuit stages each comprising a pair of anode-to-grid cross-coupled tubes of which the first, second and third stages each have an input point common to the two tubes of the pair and the fourth stage has input and output points independent to each tube of the pair, and a coincidence circuit including a coincidence lead connecting the output point of a selected one tube of the fourth stage with the output point of a selected earlier stage, the output point of each earlier stage other than said selected stage being connected to the input point for the next succeeding stage with the output point of the third stage connected to the input point for the other tube of the fourth stage, in combination with two crystal diodes connected in opposite sense in said coincidence lead, a resistor large in resistance value as compared with the output impedance of the trigger circuits and connected to the coincidence lead between the diodes therein and to said positive supply lead, an input lead to the stage next succeeding said selected earlier stage connected to the coincidence lead between the diodes therein, and a feed-forward lead connecting the output point of said earlier stage with the input point of said selected one tube of said fourth stage through a capacitive filter.

2. An electrical counter circuit according to claim 1, including in each of said first, second and third trigger circuit stages, a first and a second crystal diode connecting the input point of each said stage to the control grids of the tubes of that stage to pass a pulse of one polarity but block a pulse of the opposite polarity, and a third crystal diode shunting each said input point to a line joining said tube cathodes to maintain said input point at cathode potential.

3. An electrical counter circuit according to claim 1 wherein the crystal diodes are selenium rectifiers.

4. An electrical counter circuit according to claim 2 wherein the crystal diodes are selenium rectifiers.

5. An electrical counter circuit according to claim 1, wherein for a decade counter, said earlier stage is said first stage, said coincidence lead connects the output point of the first stage with the output point of that tube of the fourth stage which in its condition of initial stability is non-conducting, and the feed forward lead is connected to the input point of said initially non-conducting fourth stage tube.

6. An electrical counter circuit according to claim 1, wherein for a decade counter, said earlier stage is said first stage, said coincidence lead connects the output point of the first stage with the output point of that tube of the fourth stage which in its condition of initial stability is conducting, and the feed forward lead is connected to the input point of said initially conducting fourth stage tube.

7. An electrical counter circuit according to claim 1, wherein for a duodecimal counter, said earlier stage is said second stage, said coincidence lead connects the output point of the second stage with the output point of that tube of the fourth stage which in its condition of initial stability is non-conducting, and the feed forward lead is connected to the input point of said initially non-conducting fourth stage tube.

8. An electrical counter circuit according to claim 1, wherein for a duodecimal counter, said earlier stage is said second stage said coincidence lead connects the output point of the second stage with the output point of that tube of the fourth stage which in its condition of initial stability is conducting, and the feed forward lead is connected to the input point of said initially conducting fourth stage tube.

9. An electrical counter circuit according to claim 2 wherein, for a decade counter, said earlier stage is said first stage, said coincidence lead connects the output point of the first stage with the output point of that tube of the fourth stage which in its condition of initial stability is non-conducting, and the feed forward lead is connected to the input point of said initially non-conducting fourth stage tube.

10. An electrical counter circuit according to claim 2, wherein for a decade counter, said earlier stage is said first stage, said coincidence lead connects the output point of the first stage with the output point of that tube of the fourth stage which in its condition of initial stability is conducting, and the feed forward lead is connected to the input point of said initially conducting fourth stage tube.

11. An electrical counter circuit according to claim 2, wherein for a duodecimal counter, said earlier stage is said second stage, said coincidence lead connects the output point of the second stage with the output point of that tube of the fourth stage which in its condition of initial stability is non-conducting, and the feed forward lead is connected to the input point of said initially non-conducting fourth stage tube.

12. An electrical counter circuit according to claim 2, wherein for a duodecimal counter, said earlier stage is said second stage, said coincidence lead connects the output point of the second stage with the output point of that tube of the fourth stage which in its condition of initial stability is conducting, and the feed forward lead is connected to the input point of said initially conducting fourth stage tube.

References Cited in the file of this patent

UNITED STATES PATENTS

| | | |
|---|---|---|
| 2,540,442 | Grosdoff | Feb. 6, 1951 |
| 2,547,434 | Bergfors | Apr. 3, 1951 |
| 2,552,781 | Hadfield | May 15, 1951 |

OTHER REFERENCES

"The Versatile Binary Scaler," L. M. Schmidt; Radio-Electronic Engineering; August 1951; pages 15–18 and 30.

"Coincidence Technique for Getting Decade Scaling from Binary Flip-Flop Counters" by Parshad and Sagar, The Review of Scientific Instruments, vol. 24, No. 7; pages 542–544.